(12) United States Patent
Fuse et al.

(10) Patent No.: US 11,534,878 B2
(45) Date of Patent: Dec. 27, 2022

(54) PROCESSING APPARATUS

(71) Applicant: NIHON SHORYOKU KIKAI CO., LTD., Isesaki (JP)

(72) Inventors: Takeshi Fuse, Isesaki (JP); Toshiharu Miyata, Isesaki (JP); Norio Tanaka, Isesaki (JP)

(73) Assignee: NIHON SHORYOKU KIKAI CO., LTD., Isesaki (JP)

( * ) Notice: Subject to any disclaimer, the term of this patent is extended or adjusted under 35 U.S.C. 154(b) by 0 days.

(21) Appl. No.: 17/429,330

(22) PCT Filed: Oct. 19, 2020

(86) PCT No.: PCT/JP2020/039292
§ 371 (c)(1),
(2) Date: Aug. 7, 2021

(87) PCT Pub. No.: WO2022/085053
PCT Pub. Date: Apr. 28, 2022

(65) Prior Publication Data
US 2022/0203491 A1 Jun. 30, 2022

(51) Int. Cl.
*B23Q 17/22* (2006.01)
*B23Q 15/12* (2006.01)

(52) U.S. Cl.
CPC ............ *B23Q 15/12* (2013.01); *B23Q 17/22* (2013.01)

(58) Field of Classification Search
CPC ..... B23Q 17/22; B23Q 15/22; B23Q 15/2233
See application file for complete search history.

(56) References Cited

U.S. PATENT DOCUMENTS

2006/0025890 A1  2/2006  Nagatsuka
2011/0100178 A1  5/2011  Tanaka
(Continued)

FOREIGN PATENT DOCUMENTS

CN  1734379 A  2/2006
CN  101909843 A  12/2010
(Continued)

OTHER PUBLICATIONS

Office Action of the corresponding CN application No. CN202080020462.3 dated Jan. 5, 2022 and English Translation thereof.
(Continued)

*Primary Examiner* — Alan Snyder
(74) *Attorney, Agent, or Firm* — Muncy, Geissler, Olds & Lowe, P.C.

(57) ABSTRACT

A processing apparatus 1 includes: a workpiece-set-position recognition unit 114 that moves an arm distal-end portion to a specified position measurement point to measure a shape of a workpiece in a workpiece set state in which the workpiece is positioned by a workpiece positioning unit, and thereby recognizes a set position of the workpiece; a processing-point-information generation unit 115 that, based on the set position of the workpiece and processing-target-portion information 124 indicating a position of a target portion of the workpiece for specified processing, generates processing-point information 125 indicating a processing point which is a movement point of the arm distal-end portion to perform the specified processing on the workpiece using a processing tool in the workpiece set state; and a workpiece-processing control unit 116 that moves the arm distal-end portion to the processing point based on the processing-point information 125 to perform the specified processing on the workpiece using the processing tool.

3 Claims, 20 Drawing Sheets

(56) References Cited

U.S. PATENT DOCUMENTS

| | | |
|---|---|---|
| 2013/0090755 A1 | 4/2013 | Kiryu |
| 2015/0248125 A1 | 9/2015 | Kanazawa |
| 2016/0236287 A1 | 8/2016 | Tanaka |
| 2017/0129066 A1 | 5/2017 | Okuda |

FOREIGN PATENT DOCUMENTS

| | | |
|---|---|---|
| CN | 102870054 A | 1/2013 |
| CN | 103692286 A | 4/2014 |
| CN | 104756027 A | 7/2015 |
| CN | 105592988 A | 5/2016 |
| CN | 106681276 A | 5/2017 |
| CN | 109357630 A | 2/2019 |
| EP | 2226172 A1 | 9/2010 |
| JP | 8-174378 A | 7/1996 |
| JP | 2004-114203 A | 4/2004 |
| JP | 2008-273212 A | 11/2008 |
| JP | 2010-79471 A | 4/2010 |
| JP | 2016137529 A | 8/2016 |
| TW | 201915482 A | 4/2019 |

OTHER PUBLICATIONS

The extended European search report for the corresponding EP application No. 20918132.0 dated Feb. 16, 2022.
International Search Report for PCT/JP2020/039292 dated Dec. 28, 2020.
Written Opinion of the International Searching Authority for PCT/JP2020/039292 dated Dec. 28, 2020.
Office Action of the corresponding TW application No. 110138392 dated May 5, 2022 and English Translation thereof.
Office Action of the corresponding CN application No. 202080020462.3 dated Aug. 19, 2022 and English translation thereof.

FIG.7
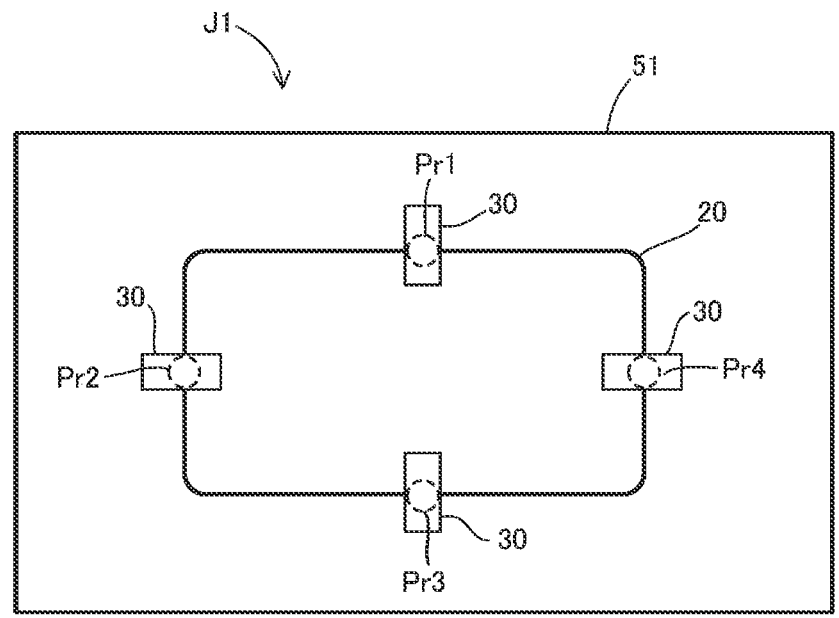
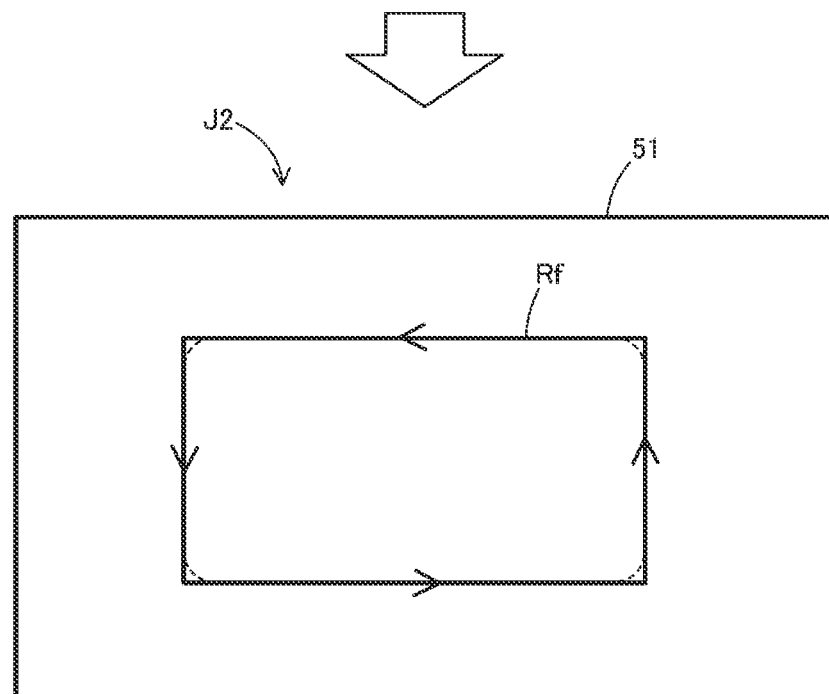

FIG.11
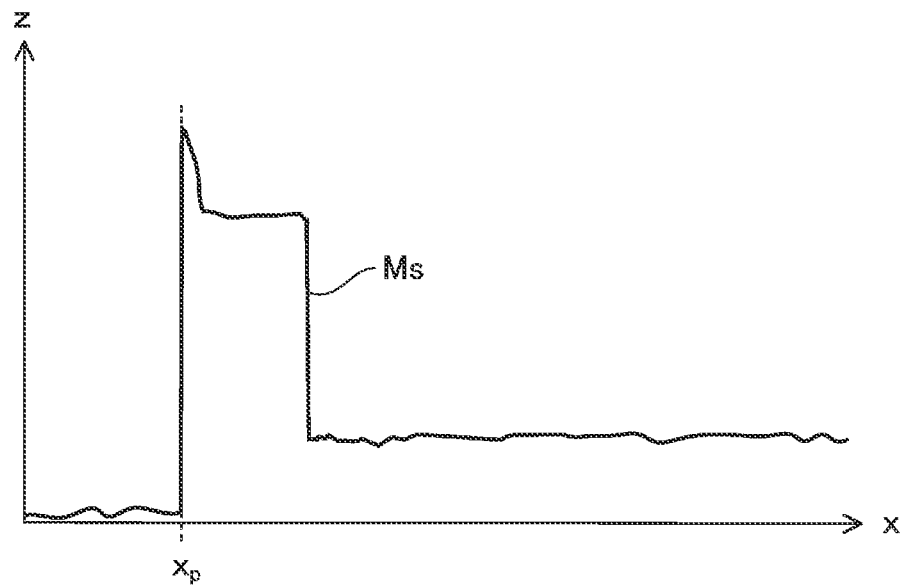
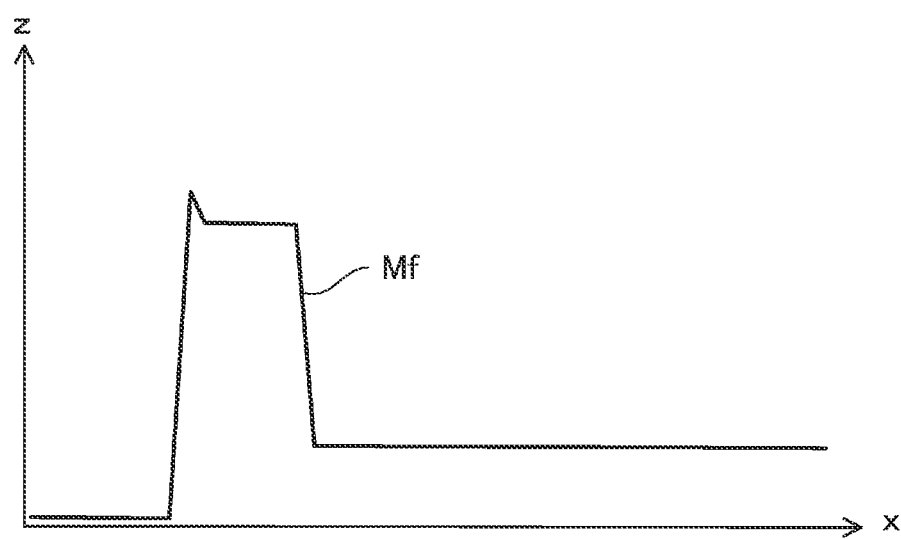

FIG.17
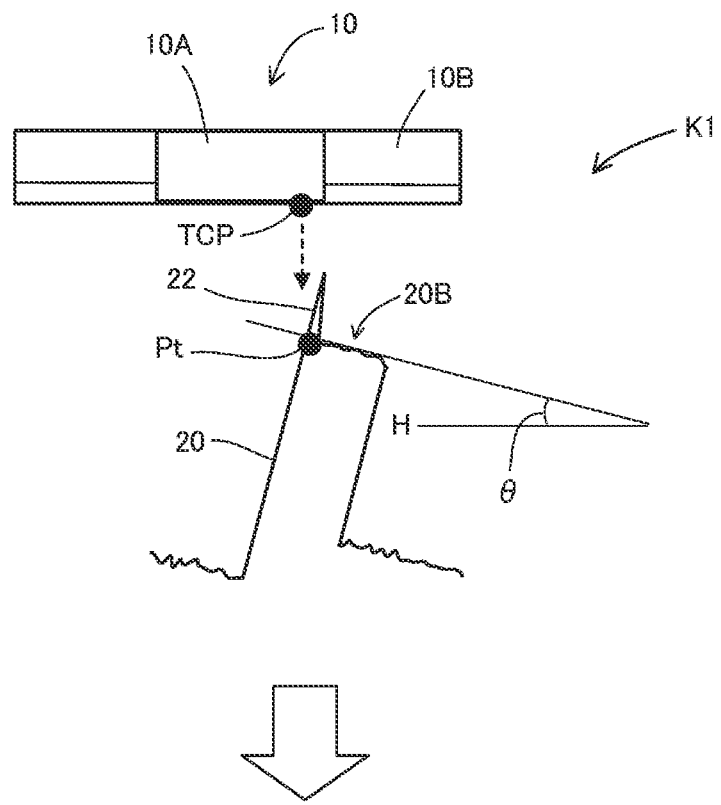
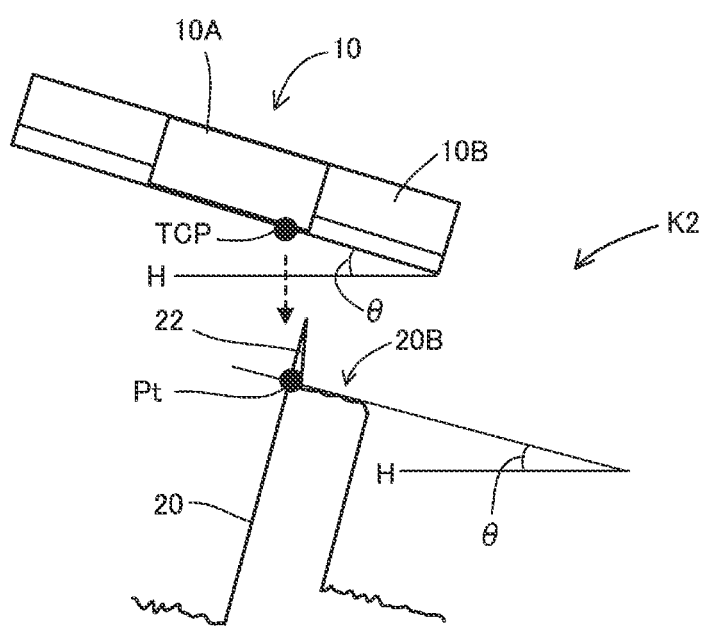

FIG.18
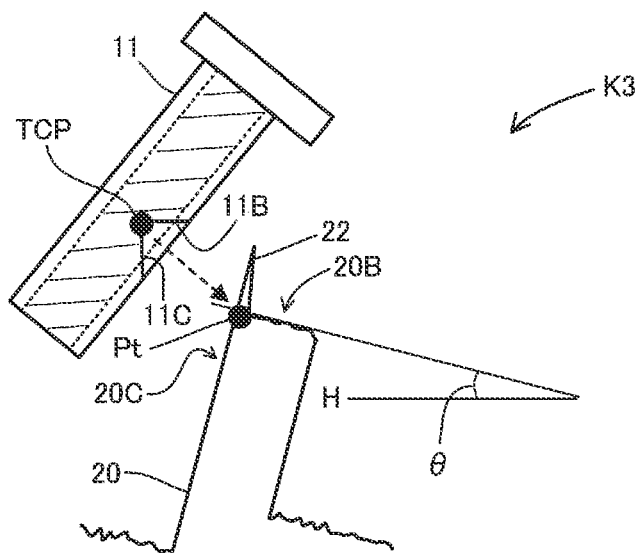
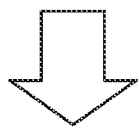
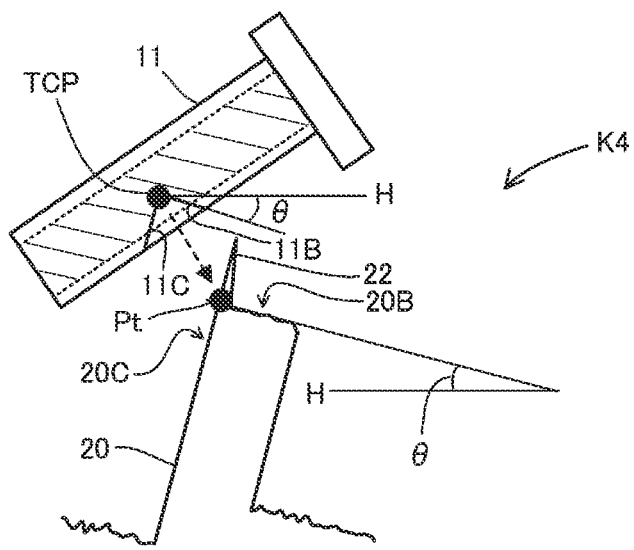

FIG.19
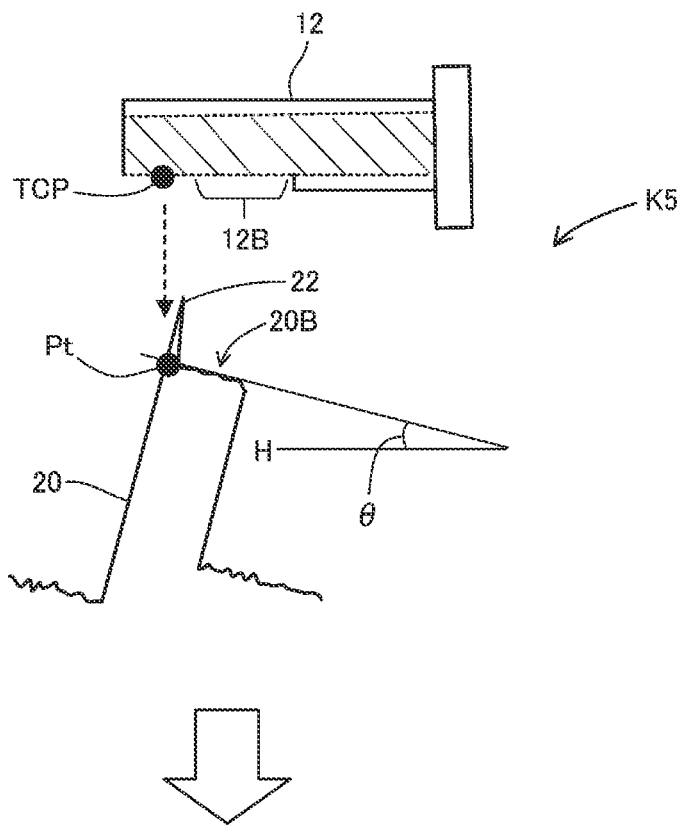
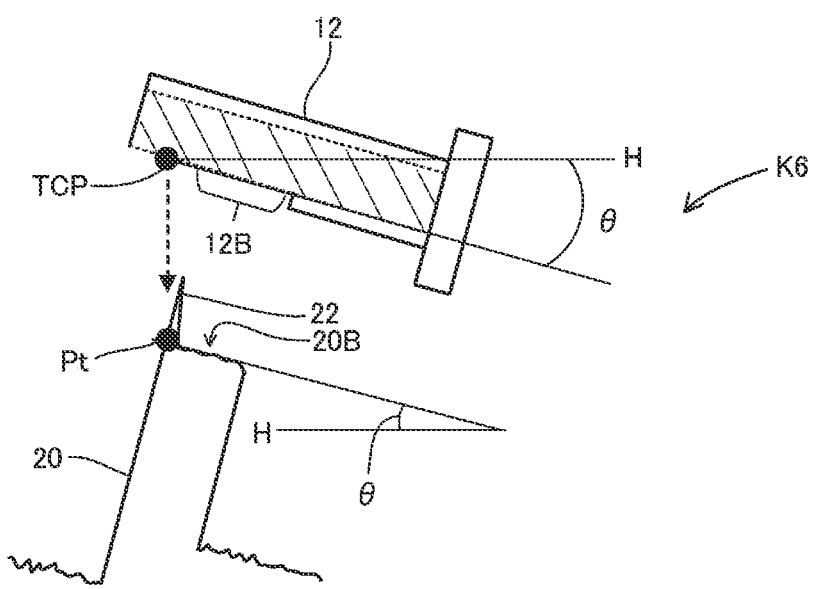

PROCESSING APPARATUS

TECHNICAL FIELD

The present invention relates to a processing apparatus.

BACKGROUND ART

In conventional techniques, an articulated robot has a processing tool configured to process resin molded articles at its arm distal-end portion, and based on path information set by direct teaching or an automatic path generation system or the like utilizing CAD data, the articulated robot guides the processing tool to processing positions and processes a resin molded article (for example, see Patent Literature 1).

CITATION LIST

Patent Literature

[Patent Literature 1]
Japanese Patent Laid-Open No. 2008-273212

SUMMARY OF INVENTION

Technical Problem

However, in the case of processing resin molded articles, since resin molded articles to be processed have large variations in dimensions, path information set by direct teaching or an automatic path generation system does not always indicate right paths.

Thus, conventional techniques require the work of correcting teaching positions, which makes the substantial processing time longer.

An object of the present invention is to provide a processing apparatus that does not require teaching work or the like for the articulated robot.

Solution to Problem

An aspect to achieve the above object is a processing apparatus including: an articulated robot having an arm distal-end portion to which a processing tool and a shape measurement unit are attached; a workpiece-set-position recognition unit that moves the arm distal-end portion to a specified position measurement point to measure a shape of a workpiece in a workpiece set state in which the workpiece is positioned by a workpiece positioning unit, and thereby recognizes a set position of the workpiece; a processing-point-information generation unit that, based on the set position of the workpiece recognized by the workpiece-set-position recognition unit and processing-target-portion information indicating a position of a target portion of the workpiece for specified processing, generates processing-point information indicating a processing point which is a movement point of the arm distal-end portion to perform the specified processing on the workpiece using the processing tool in the workpiece set state; and a workpiece-processing control unit that moves the arm distal-end portion to the processing point based on the processing-point information to perform the specified processing on the workpiece using the processing tool.

The above processing apparatus may have a configuration in which the specified processing is partial processing for processing a part of the workpiece, and the processing apparatus includes a processing-target-portion-information generation unit that measures the shape of the workpiece using the shape measurement unit to recognize a position of a portion to be processed of the workpiece and, based on the position of the portion to be processed, generates the processing-target-portion information.

The above processing apparatus may have a configuration in which the shape measurement unit measures a distance between the shape measurement unit and a measurement target at a plurality of distance measurement points within a measurement area in a specified direction, and the processing-target-portion-information generation unit calculates group data of length measurement values at a plurality of positions on the workpiece in the specified direction from distance measurement values at the plurality of distance measurement points, the distance measurement values being measured on the workpiece by the shape measurement unit, calculates a plurality of length measurement values on the workpiece in the specified direction within the measurement area, and recognizes the position of the portion to be processed of the workpiece based on change in the plurality of length measurement values.

The above processing apparatus may have a configuration in which the processing-point-information generation unit extracts an end point of the portion to be processed based on the change in the plurality of length measurement values to recognize the position of the portion to be processed of the workpiece.

The above processing apparatus may have a configuration in which the processing-point-information generation unit extracts the end point of the portion to be processed by smoothing the plurality of length measurement values by a moving average method, determining a search range for the position of the portion to be processed based on first-order derivative values of the smoothed length measurement values, and searching the search range for a peak point of second-order derivative values of the length measurement values subjected to the smoothing.

The above processing apparatus may have a configuration in which the partial processing is removal processing for removing a part of the workpiece.

The above processing apparatus may have a configuration in which the workpiece is a resin molded member, the processing tool is a cutting tool having a cutting edge portion configured to be positioned at a root portion of a burr of the resin molded member and a profiling portion not having a cutting edge and configured to be positioned at a profiled surface portion of the resin molded member, and the cutting tool is attached to the arm distal-end portion via a pressing mechanism that presses the profiling portion against the profiled surface portion of the resin molded member at a specified pressure.

The above processing apparatus may have a configuration in which the processing-target-portion-information generation unit, when measuring the shape of the workpiece, recognizes a tilt of the profiled surface portion relative to a specified reference surface, and the processing apparatus includes a workpiece-processing control unit that controls, according to the tilt of the profiled surface portion, an orientation of the cutting tool at a time of performing deburring processing.

Advantageous Effect of Invention

In the processing apparatus of the above aspects, the processing-point-information generation unit generates the processing-point information for performing specified processing on the workpiece based on the set position of the workpiece and the processing-target-portion information. Thus, it eliminates the need for the work of teaching the articulated robot the positions of the processing target portions of the workpiece.

BRIEF DESCRIPTION OF DRAWINGS

FIG. 7 is a diagram for explaining the process of recognizing the set position of a workpiece.

FIG. 11 is a diagram for explaining the process of smoothing a group of measurement values of the height of the workpiece.

FIG. 17 is a diagram for explaining a mode in which the orientation of a cutting tool is controlled according to the tilt of a profiled surface portion.

FIG. 18 is a diagram for explaining a mode in which the orientation of an end mill including profiling portions having a right angle is controlled according to the tilt of profiled surface portions.

FIG. 19 is a diagram for explaining a mode in which the orientation of an end mill including a parallel profiling portion is controlled according to the tilt of a profiled surface portion.

DESCRIPTION OF EMBODIMENTS

An example of an embodiment of the present invention will be described with reference to FIGS. 1 to 19

1. Configuration of Processing Apparatus

Figure 1:
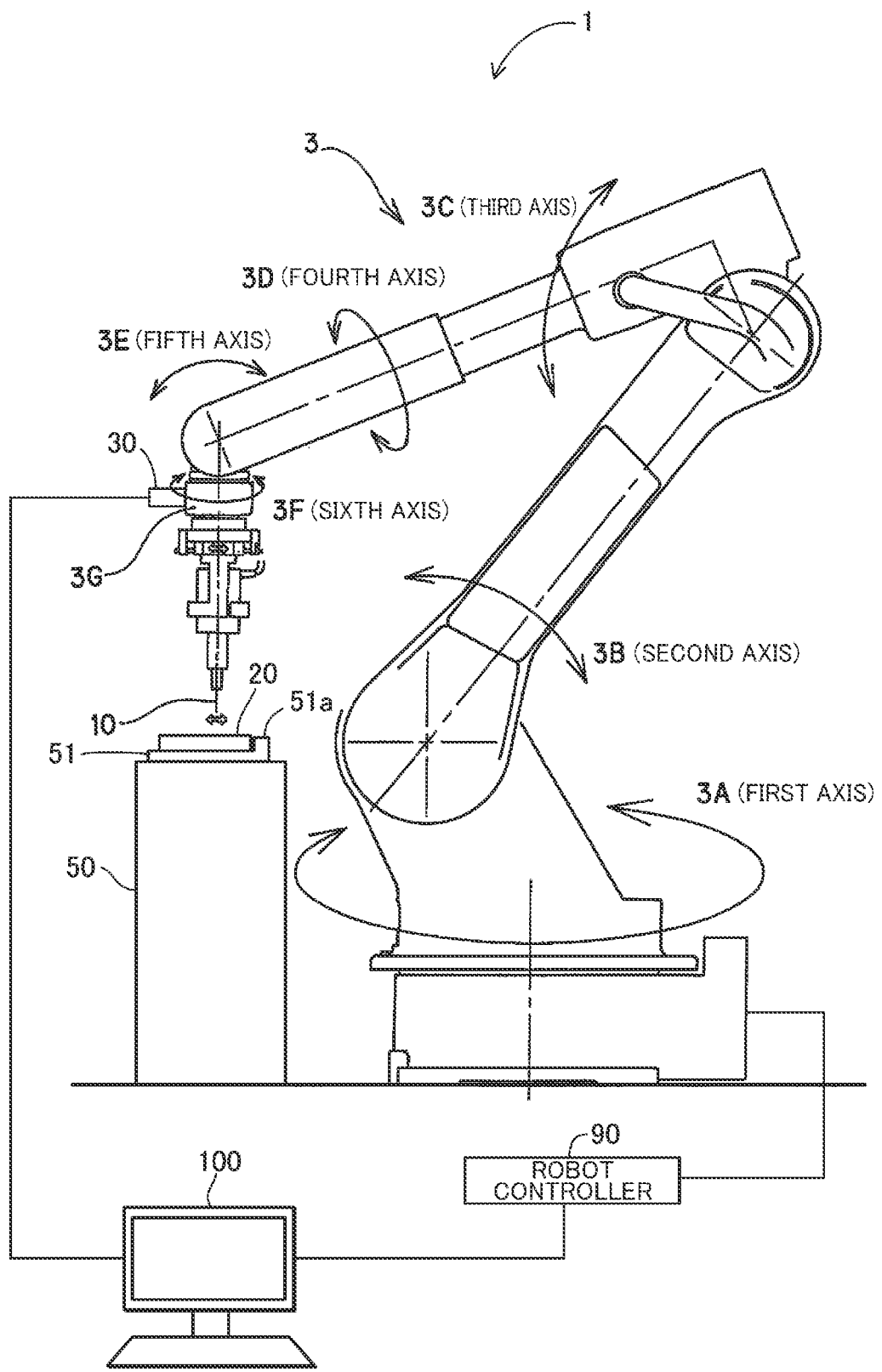
FIG. 1 is a diagram for explaining the overall configuration of a processing apparatus.

The configuration of a processing apparatus 1 in the present embodiment will be described with reference to FIGS. 1 to 4. FIG. 1 is a diagram for explaining the overall configuration of the processing apparatus 1. The processing apparatus 1 includes a 6-axis vertical articulated robot 3, a robot controller 90 for controlling the operation of the articulated robot 3, a workpiece receiving unit 51 fixed on a base frame 50, and a computing device 100 that executes setting of processing points for the articulated robot 3 and other tasks by executing the processes described later.

A workpiece 20 to be processed by the processing apparatus 1 is placed on the workpiece receiving unit 51 with the movement of the workpiece 20 restricted by a guide 51a and the like. In this way, the workpiece 20 placed on the workpiece receiving unit 51 is positioned at a specified position within the movable range of the articulated robot 3. The workpiece receiving unit 51 corresponds to a workpiece positioning unit in the present invention. In the present embodiment, the workpiece 20 is a resin molded article, and as specified processing on the workpiece 20, deburring processing, which is partial processing on the workpiece 20, is performed.

Figure 10:
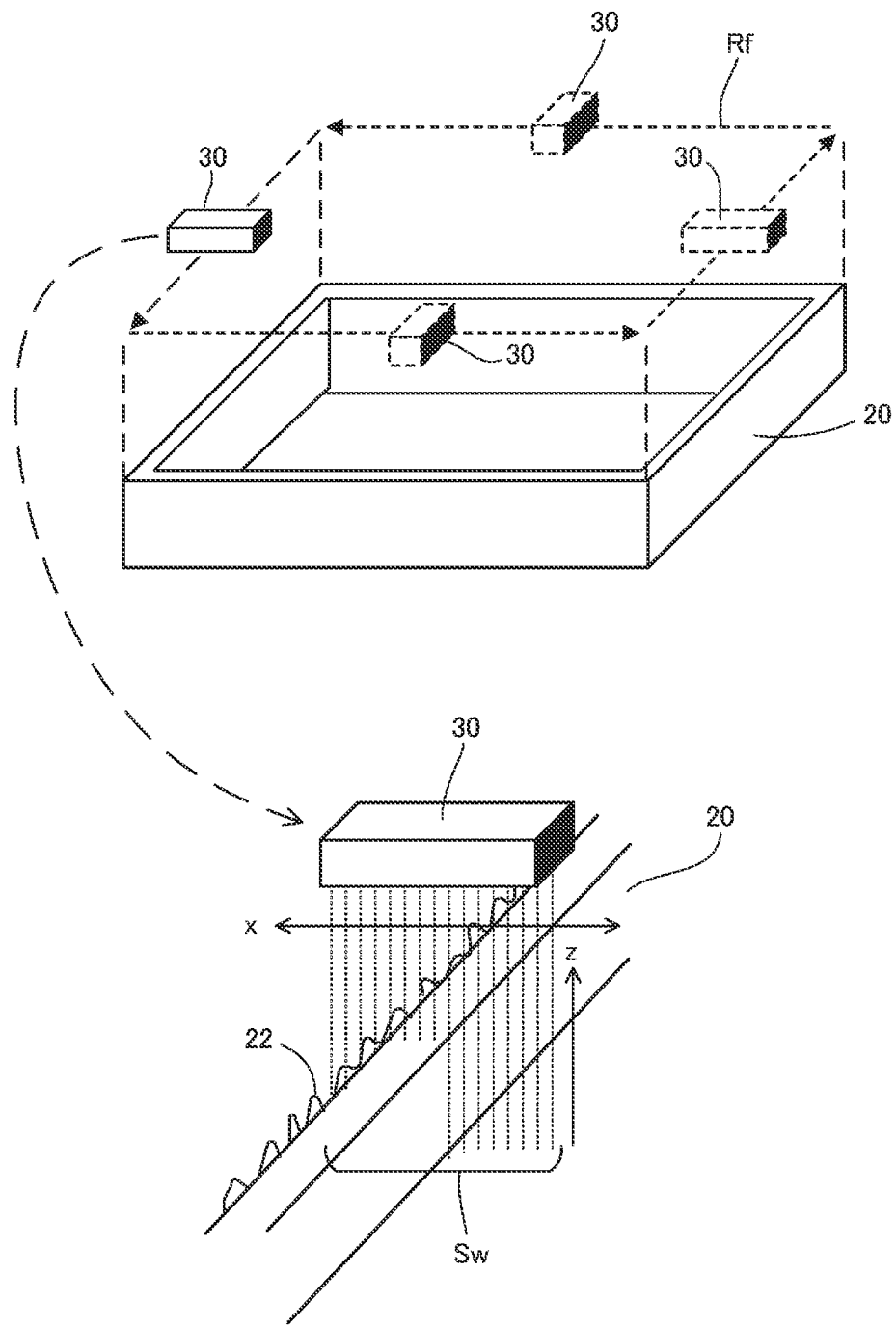
FIG. 10 is a diagram for explaining the process of measuring height distribution of the workpiece with a laser sensor.

The computing device 100 is, for example, a personal computer and is communicably connected to a laser sensor 30 and the robot controller 90. Note that the robot controller 90 and the computing device 100 may be integrated into one control unit, as a possible configuration. The laser sensor 30, as illustrated in FIG. 10, measures the distance to a measurement target object (the workpiece 20 in this case) at a plurality of measurement points within a specified width Sw in a specified direction (the x direction in FIG. 10). The laser sensor 30 corresponds to a shape measurement unit in the present invention.

The laser sensor 30 is provided on an arm distal-end portion 3G of a joint portion 3F, which is the one at the distal end of 6-axis joint portions 3A to 3F of the articulated robot 3. A cutter blade 10 is attached to the arm distal-end portion 3G. The cutter blade 10 corresponds to a processing tool in the present invention.

Figure 2:
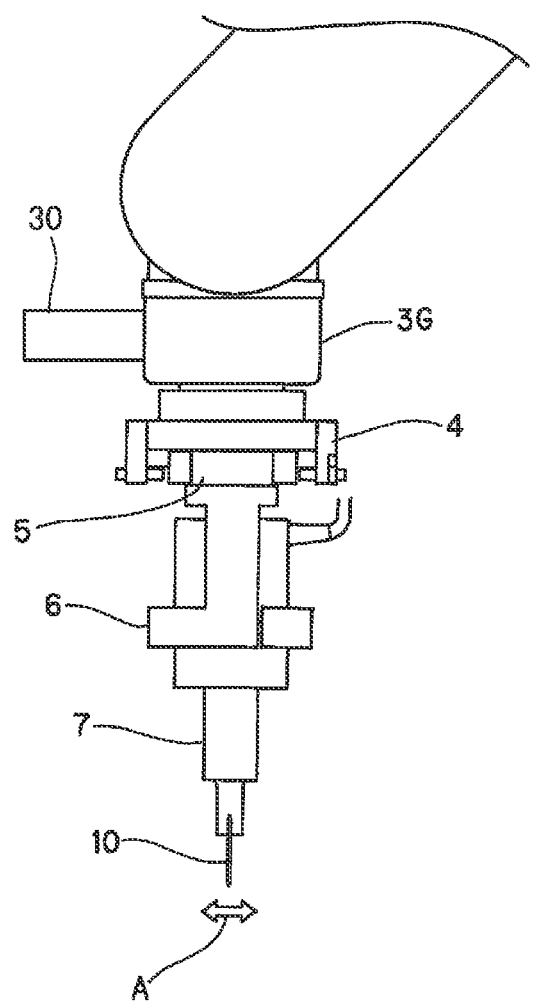
FIG. 2 is a diagram for explaining an arm distal-end portion of an articulated robot.

FIG. 2 is an enlarged diagram for explaining the arm distal-end portion 3G. As illustrated in FIG. 2, an air-driven sliding table 4 is attached to the arm distal-end portion 3G, and the sliding table 4 is provided with a sliding unit 5. This sliding unit 5 is a floating mechanism the position of which can be moved in the arrow A direction depending on the balance of the air pressures applied to air supply ports (not illustrated) provided on both sides of the arm distal-end portion 3G and that, in other words, is configured to be in a floated state relative to the workpiece 20.

The pressures applied to the air supply ports provided on both sides of the arm distal-end portion 3G can be controlled independently so that the pressures can be balanced, and when the tool weight is a burden due to the tool orientation, the pressure applied to each air supply port can be automatically adjusted according to the tool orientation to cancel this tool weight. An ultrasonic-oscillator holder 6 is attached to the sliding unit 5 in the floated state relative to the workpiece 20, and an ultrasonic transducer (vibrator or oscillator) 7 is attached to this ultrasonic-oscillator holder 6.

Figure 3:
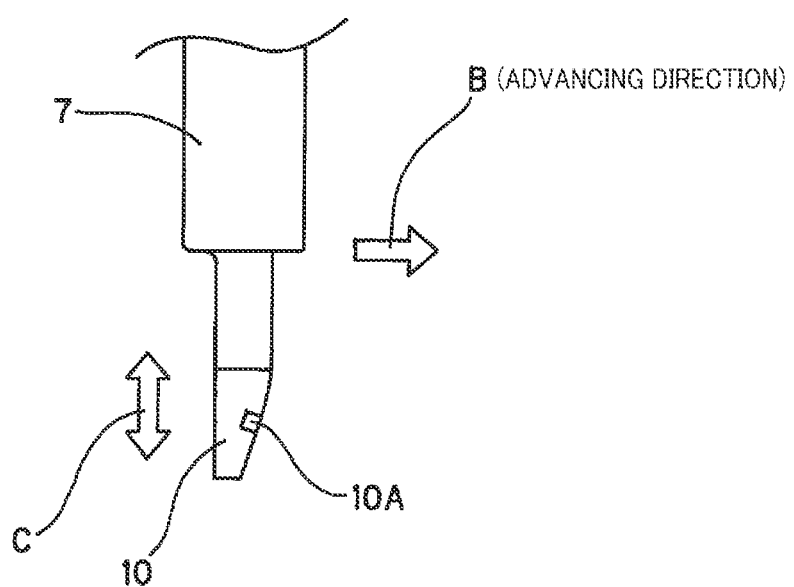
FIG. 3 is a plan view of an attachment portion of a cutter blade.

FIG. 3 is a plan view of an attachment portion of the cutter blade. The ultrasonic oscillator 7 has the cutter blade 10, which is a cutting tool, fixed at its distal end as illustrated in FIG. 3. This cutter blade 10, as illustrated in FIG. 3, vibrates ultrasonically based on the vibration of the ultrasonic oscillator 7 in a direction (the arrow C direction) approximately orthogonal to the direction (the arrow B direction) in which the cutter blade 10 advances. The ultrasonic oscillator 7 is connected to an ultrasonic unit (not illustrated) and driven by the ultrasonic unit.

Figure 4:
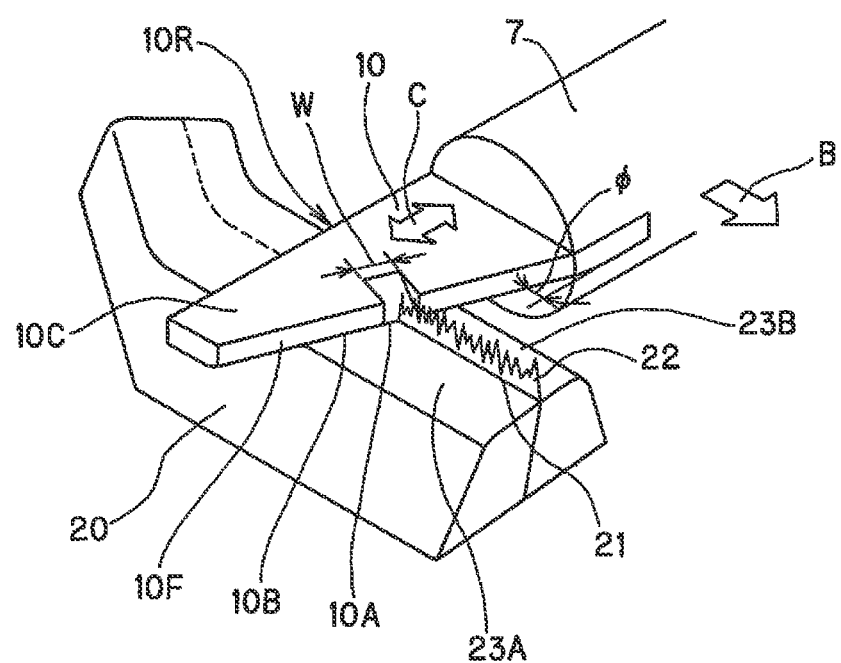
FIG. 4 is an enlarged perspective view of the attachment portion of the cutter blade during deburring operation.

FIG. 4 is an enlarged perspective view of the attachment portion of the cutter blade 10 during deburring operation. The cutter blade 10 has a front-end surface 10F and a rear-end surface 10R, and, as illustrated in FIG. 4, comes in contact with the base portions (root portions) of burrs 22 formed on a partition line 21 of a resin molded article 20, which is an article to be processed (for example, parts for nursing beds, parts for copy machines, tool boxes, thermally insulated resin boxes, automobile air spoilers, automobile visors, automobile center pillars, automobile interior seats, and the like). Although the setback angle φ of the front-end surface 10F is appropriately set, in this case it is approximately 10 degrees or so.

In the present embodiment, the cutter blade 10 includes a cutting edge portion 10A having a width of, for example, several millimeters or so and configured to be positioned at the root portions of the burrs 22, a profiling portion 10B having a curved surface, not having a cutting edge, and configured to be positioned at surfaces 23A and 23B of the workpiece 20, and a cutter-blade main body 10C. Although in this case, the width W of the cutting edge portion 10A is typically 0.6 to 1 mm or so, the width W can be changed as appropriate depending on the shapes and other factors of the burrs formed on the article to be processed.

The sliding table 4 and the sliding unit 5 compose a pressing mechanism in the present invention, and this pressing mechanism enables the cutting edge portion 10A to come in contact with the root portions of the burrs 22 with the cutter blade 10 pressed against the workpiece 20 and also enables the profiling portion 10B to come in contact with surface portions of the workpiece 20. Thus, in the case of cutting off the burrs 22 of the workpiece 20 which is a resin molded member the shape of which tends to be unstable, it is possible to prevent the cutter blade 10 from cutting into the workpiece 20 too deeply and thus possible to prevent the occurrence of failures, such as breakage of the blade.

2. Configuration of Computing Device

The configuration of the computing device 100 will be described with reference to FIG. 5. The computing device 100 is a computer unit including a processor 110, a memory 120, a not-illustrated interface circuit, and other components. The computing device 100 transmits and receives various kinds of data to and from the robot controller 90. The computing device 100 controls execution timing of measurement by the laser sensor 30 and receives measurement data outputted from the laser sensor 30.

The memory 120 stores a control program 121 for the processing apparatus 1, workpiece-shape information 122, approximate-position measurement-point information 123, processing-target-portion information 124, and processing-point information 125. The workpiece-shape information 122 includes data on the prescribed shape of the workpiece 20 (CAD data or actual measurement data). The approximate-position measurement-point information 123 includes data on approximate-position measurement points which are the positions of the arm distal-end portion 3G for recognizing an approximate position of the workpiece 20 set in the workpiece receiving unit 51. The data on the approximate-position measurement points are data of coordinate values in a three-dimensional coordinate system of the articulated robot 3 (hereinafter referred to as a robot coordinate system).

The processing-target-portion information 124 includes data on the position of the target portion (the portion to be processed) for deburring processing on the workpiece 20. The processing-point information 125 includes data on processing points which are the positions of the arm distal-end portion 3G at the time when the cutter blade 10 performs deburring processing with the workpiece 20 set in the workpiece receiving unit 51 (in the workpiece-set state). The data on the processing points is coordinate values in the robot coordinate system.

The processor 110 reads and executes the control program 121 stored in the memory 120 to function as a workpiece-shape-information obtaining unit 111, an approximate-position measurement-point-information obtaining unit 112, a processing-target-portion-information generation unit 113, a workpiece-set-position recognition unit 114, a processing-point-information generation unit 115, and a workpiece-processing control unit 116.

The workpiece-shape-information obtaining unit 111, for example, reads the workpiece-shape information 122 stored in a recording medium 200 and stores it in the memory 120. The approximate-position measurement-point-information obtaining unit 112, for example, reads the approximate-position measurement-point information 123 stored in the recording medium 200 and stores it in the memory 120. Details of the workpiece-shape information 122 and the approximate-position measurement-point information 123 will be described later.

The processing-target-portion-information generation unit 113 recognizes the position of the processing target portion which is the target portion for deburring on the workpiece 20 and generates the processing-target-portion information 124. Details of the generation process for the processing-target-portion information 124 will be described later. The workpiece-set-position recognition unit 114 recognizes the position of the workpiece 20 set in the workpiece receiving unit 51 by measuring it with the laser sensor 30.

The processing-point-information generation unit 115 recognizes the position of the processing target portion of the workpiece 20 set in the workpiece receiving unit 51 based on the workpiece-shape information 122, the set position of the workpiece 20 recognized by the workpiece-set-position recognition unit 114, and the processing-target-portion information 124. Then, the processing-point-information generation unit 115 sets processing points which are points of the articulated robot 3 coordinates, based on the position of the cutter blade 10 during the deburring processing, and generates each piece of processing-point information including the data on the processing points.

The workpiece-processing control unit 116 transmits the processing-point information 125 to the robot controller 90 and moves the arm distal-end portion 3G of the articulated robot 3 to each processing point to execute the deburring processing on the workpiece 20.

3. Process for Deburring Processing

A series of processes from preparation to performance of deburring processing will be described based on the flowchart illustrated in FIG. 6.

Figure 6:
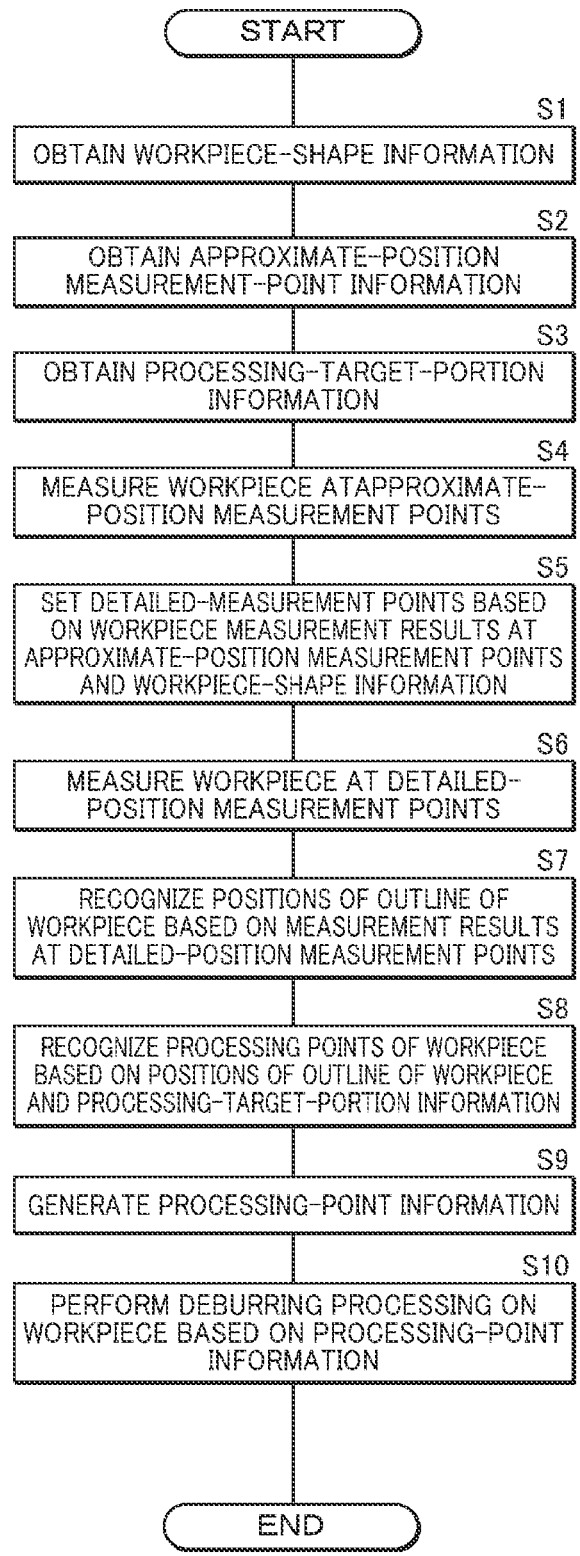
FIG. 6 is a flowchart of a series of processes from preparation to performance of deburring processing.

In step S1 in FIG. 6, the workpiece-shape-information obtaining unit 111 reads the workpiece-shape information 122 from the recording medium 200 and stores it in the memory 120. In the following step S2, the approximate-position measurement-point-information obtaining unit 112, as indicated with J1 in FIG. 7, obtains the approximate-position measurement-point information 123 including data on the positions (values of the three-dimensional coordinates of the articulated robot 3) of approximate-position measurement points Pr1, Pr2, Pr3, and Pr4 which are the positions of the laser sensor 30 for measuring a rough position of the workpiece 20 set in the workpiece receiving unit 51. The approximate-position measurement points are set to positions at which ends of the workpiece 20 are within the measurement range of the laser sensor 30, based on the set position (positioning position) of the workpiece 20 in the workpiece receiving unit 51. Note that the number of approximate-position measurement points to be set may be three or less or five or more.

Figure 8:
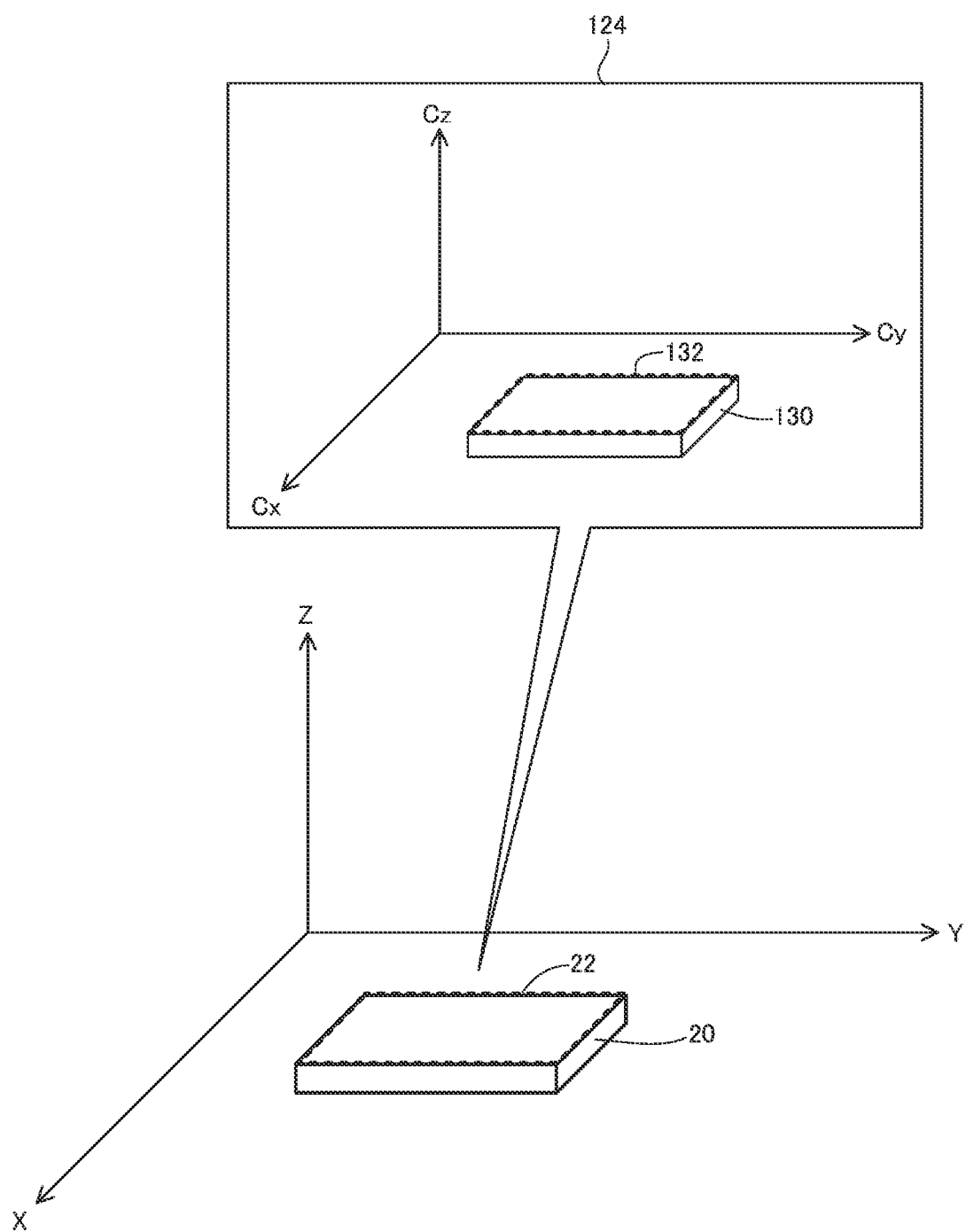
FIG. 8 is a diagram for explaining the process of setting processing points based on the set position of the workpiece and processing-target-portion information.

In the following step S3, the processing-target-portion-information generation unit 113 generates the processing-target-portion information 124 and stores it in the memory 120. The processing-target-portion information 124, as illustrated in FIG. 8, is information indicating the positions of a processing target portion 132 (at which burrs occurred) in a prescribed shape 130 of the workpiece 20 in the reference coordinate system (CAD coordinate system or the like) Cx, Cy, Cz. Details of the generation process for the processing-target-portion information 124 will be described later.

The next step S4 to step S7 are processes performed by the workpiece-set-position recognition unit 114. In step S4, the workpiece-set-position recognition unit 114 moves the arm distal-end portion 3G of the articulated robot 3 to the approximate-position measurement points Pr1, Pr2, Pr3, and Pr4 and performs distance measurement at each point with the laser sensor 30.

In the following step S5, the workpiece-set-position recognition unit 114 recognizes the ends of the workpiece 20 from changes in the measurement values of the distances at the approximate-position measurement points Pr1, Pr2, Pr3, and Pr4 and recognizes a rough set position of the workpiece 20. Then, based on the workpiece-shape information 122, the workpiece-set-position recognition unit 114 sets, as indicated with J2 in FIG. 7, a plurality of detailed-position measurement points on a path Rf, which is assumed positions of the outline of the workpiece 20, for measuring the outline positions of the workpiece 20 in detail.

In the next step S6, the workpiece-set-position recognition unit 114 performs measurement with the laser sensor 30 at the plurality of detailed-position measurement points while moving the arm distal-end portion 3G of the articulated robot 3 along the path Rf. In step S7, the workpiece-set-position recognition unit 114 recognizes the position of (the positions of the outline of) the workpiece 20 based on measurement values obtained at the plurality of detailed-position measurement points.

In the following step S8, the processing-point-information generation unit 115, as illustrated in FIG. 8, recognizes the positions of the burrs 22, which are processing portions, in the robot coordinate system X, Y, Z, based on the processing-target-portion information 124 and the position of the workpiece 20 in the robot coordinate system X, Y, Z recognized by the workpiece-set-position recognition unit 114.

Specifically, the processing-point-information generation unit 115 converts the positions of the processing target portion 132 in the prescribed shape 130 into the corresponding positions in the robot coordinate system X, Y, Z, based on the difference between the position of the prescribed shape 130 of the workpiece 20 in the reference coordinate system Cx, Cy, Cz and the position of the workpiece 20 in the robot coordinate system X, Y, Z, and recognizes the positions of the processing target portion 22 (burrs) of the workpiece 20 as processing points.

As described above, by generating the processing-point information 125 through the processes in steps S1 to S9, it is possible to eliminate the need for the work of teaching the processing target portion 22 of the workpiece 20 by the operator.

In the next step S9, the processing-point-information generation unit 115 transmits the processing-point information 125 indicating the recognized processing points to the robot controller 90. In the following step S10, the workpiece-processing control unit 116 transmits, to the robot controller 90, command data for an instruction to perform deburring processing based on the processing-point information and executes the deburring processing on the workpiece 20.

4. Generation Process for Processing-Target-Portion Information

Figure 9:
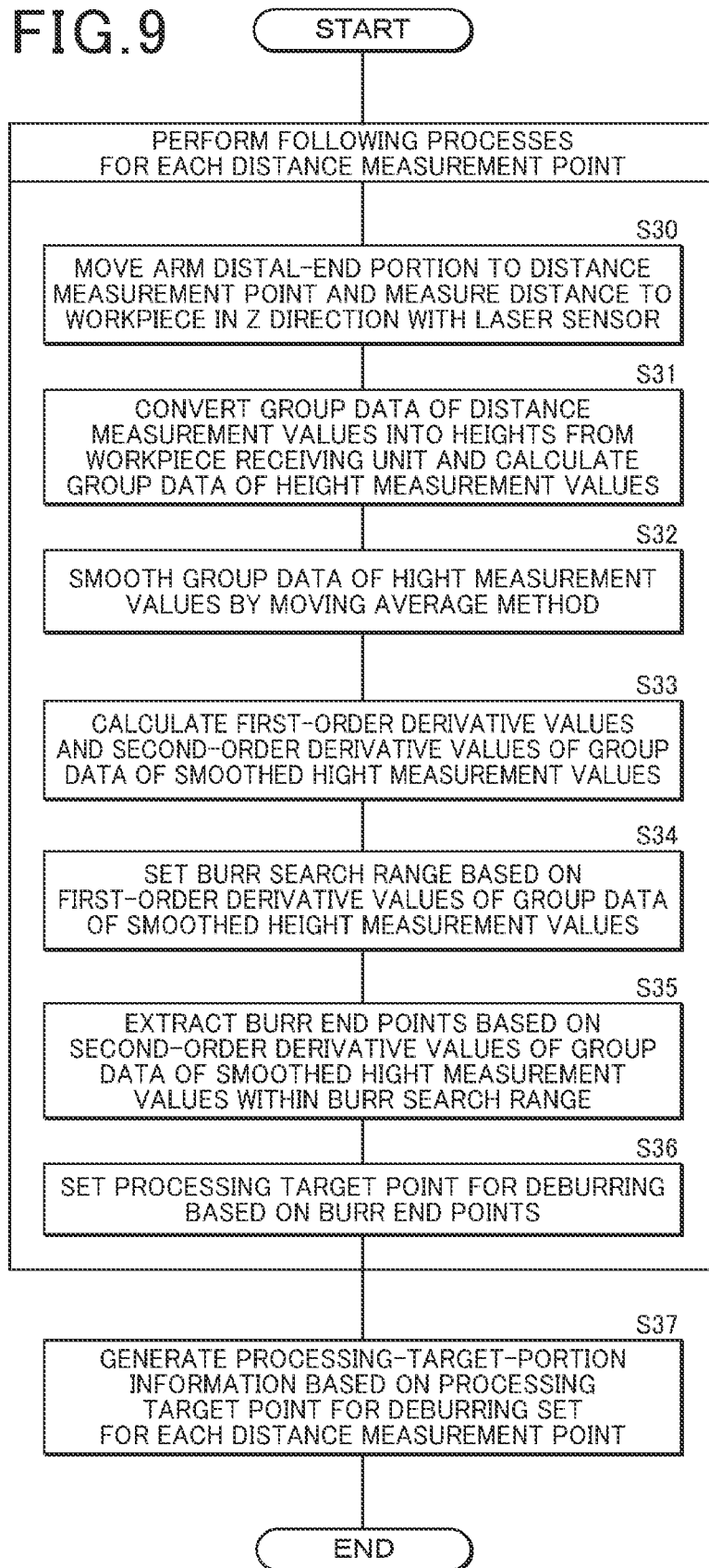
FIG. 9 is a flowchart of the process of recognizing the positions of burrs formed on the workpiece and generating the processing-target-portion information.

Based on the flowchart illustrated in FIG. 9, the generation process for the processing-target-portion information 124 by the processing-target-portion-information generation unit 113 will be described with reference to FIGS. 10 to 16. The processing-target-portion-information generation unit 113 executes the processes in steps S30 to S36 for each of the plurality of distance measurement points set according to the outline positions of the workpiece 20.

In step S30, the processing-target-portion-information generation unit 113, as illustrated in FIG. 10, measures the distance to the workpiece 20 in the Z direction with the laser sensor 30 at each distance measurement point while moving the arm distal-end portion 3G of the articulated robot 3 along the measurement path Rf. In the next step S31, the processing-target-portion-information generation unit 113 converts group data of measurement values in the x direction into heights z from the workpiece receiving unit 51 and thus calculates group data of the height measurement values z in the x direction. The height z corresponds to the length of the workpiece 20 in the Z direction, and the height measurement value corresponds to the length measurement value in the present invention.

In the following step S32, the processing-target-portion-information generation unit 113 smooths the group data of the height measurement values by a moving average method. Here, FIG. 11 illustrates group data Ms of height measurement values and group data Mf obtained by smoothing by a moving average method, in which the vertical axis is set as the height z and the horizontal axis is set as the position in the x direction. The smoothing can eliminate noise components in measurement values by the laser sensor 30. The symbol $x_p$ in FIG. 11 indicates a maximum-value coordinate at which the height measurement value z is maximum.

Figure 12:
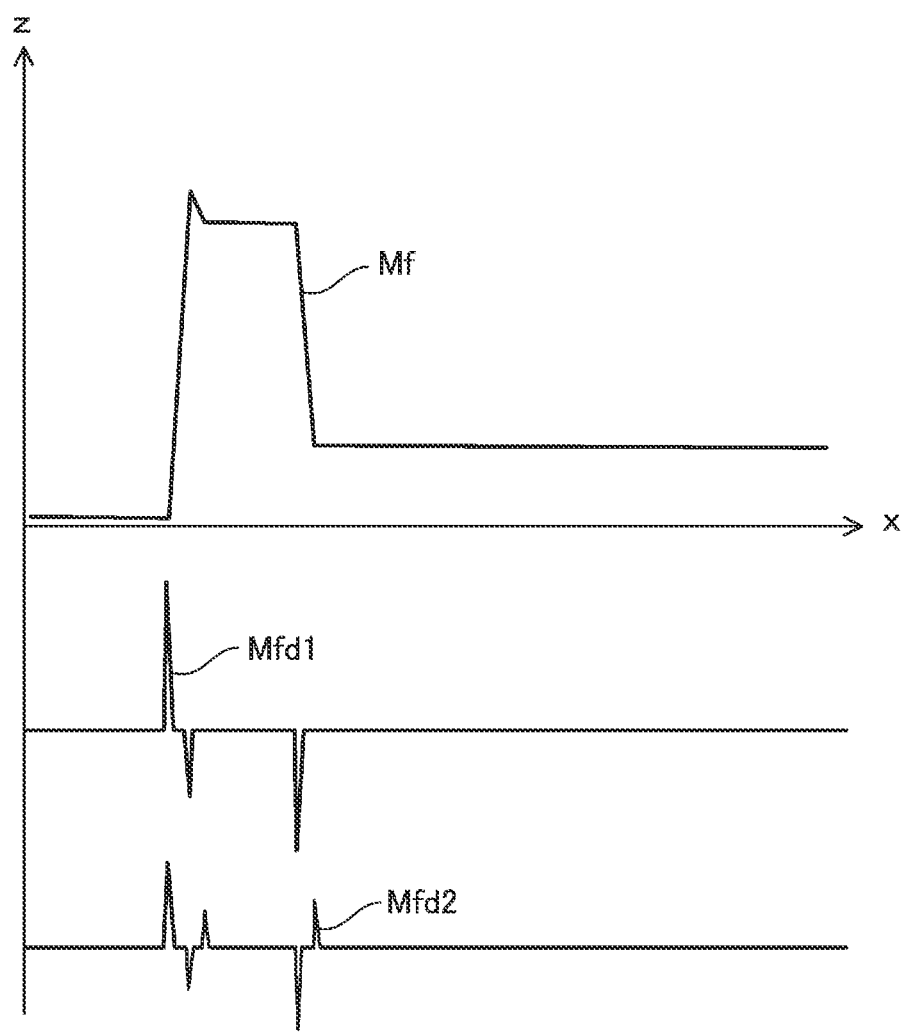
FIG. 12 is a diagram for explaining the group of measurement values of the height of the workpiece subjected to the smoothing process, the first-order derivative values, and the second-order derivative values.

In the next step S33, the processing-target-portion-information generation unit 113 calculates the first-order derivative values and the second-order derivative values of the group data Mf of the smoothed height measurement values. Here, FIG. 12 illustrates the smoothed group data Mf, the first-order derivative values Mfd1, and the second-order derivative values Mfd2, in which the vertical axis is set as the height z and the horizontal axis is set as the position in the x direction.

Figure 13:
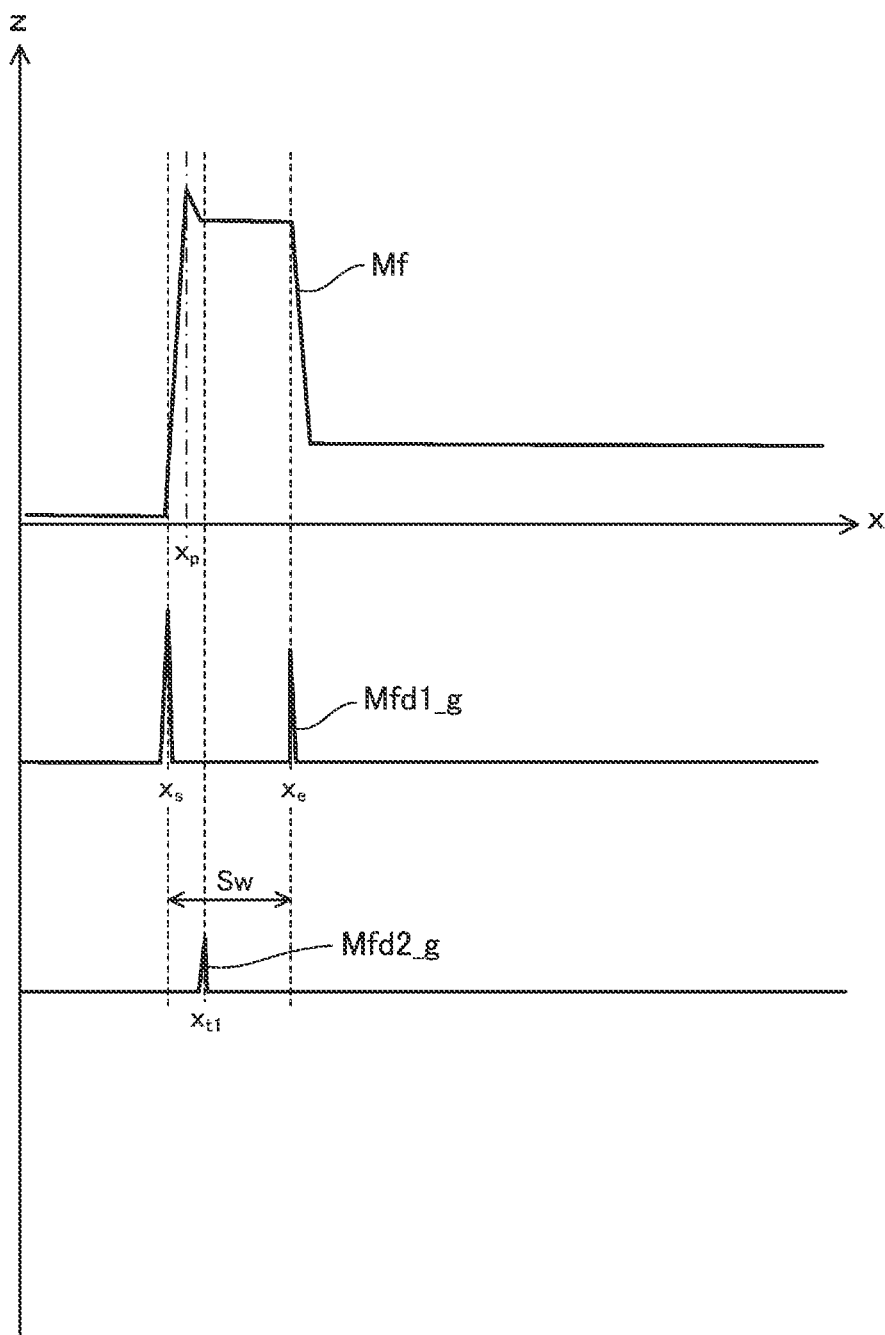
FIG. 13 is a diagram for explaining the process of removing the measurement values the values of which are small relative to the average values of the first-order derivative values and the second-order derivative values.

In the following step S34, the processing-target-portion-information generation unit 113 sets a burr search range based on the group data Mfd1 of the first-order derivative values. Specifically, the processing-target-portion-information generation unit 113 calculates the average value of the group data Mfd1 of the first-order derivative values, calculates the ratio of the absolute value of each first-order derivative value to the absolute value of this average value, and calculates group data Mfd1_g in which the first-order derivative values the aforementioned ratios of which are smaller than or equal to a first threshold are replaced with zeros, as illustrated in FIG. 13.

Then, the processing-target-portion-information generation unit 113 searches for peak points first found in the positive and negative directions from the maximum-value coordinate $x_p$ used as a reference. In the example of FIG. 13, a peak point $x_s$ is found in the negative direction from the maximum-value coordinate $x_p$ and a peak point $x_e$ is found in the positive direction, and in this case, the processing-target-portion-information generation unit 113 sets Sw between the peak point $x_s$ and the peak point $x_e$ as the search range for burr end points. Note that in the case in which a peak point is not found in the positive direction or in the negative direction, the processing-target-portion-information generation unit 113 sets the range to the end in that direction of the measurement range of the laser sensor 30 as the search range for burr end points.

In the next step S35, the processing-target-portion-information generation unit 113 extracts burr end points based on group data Mfd2 of the second-order derivative values. Specifically, the processing-target-portion-information generation unit 113 calculates the average value of the group data Mfd2 of the second-order derivative values, calculates the ratio of the absolute value of each second-order derivative value to the absolute value of this average value, and calculates group data Mfd2_g in which the second-order derivative values the aforementioned ratios of which are smaller than or equal to a second threshold are replaced with zeros, as illustrated in FIG. 13.

Then, the processing-target-portion-information generation unit 113 searches for peak points of the group data Mfd2_g within the search range Sw. In the case in which the processing-target-portion-information generation unit 113 finds at least one peak point of the group data Mfd2_g, the processing-target-portion-information generation unit 113 recognizes the found peak point as a burr end point. In the case in which a peak point is not found, the processing-target-portion-information generation unit 113 searches the outside of the search range Sw for a peak point of the group data Mfd1_g.

Then, in the case in which the processing-target-portion-information generation unit 113 finds a peak point of the group data Mfd1_g outside the search range Sw, the processing-target-portion-information generation unit 113 sets a new search range for a burr end point based on the position of the newly found peak point and searches for a peak point of the group data Mfd2_g, and then, when a peak point is found, the processing-target-portion-information generation unit 113 recognizes the found peak point as a burr end point.

In the case in which a peak point of the group data Mfd1_g is not found outside the search range Sw, and in the case in which a peak point of the group data Mfd2_g is not found in the new search range, the processing-target-portion-information generation unit 113 judges that the burr position cannot be recognized and terminates the process.

Figure 14:
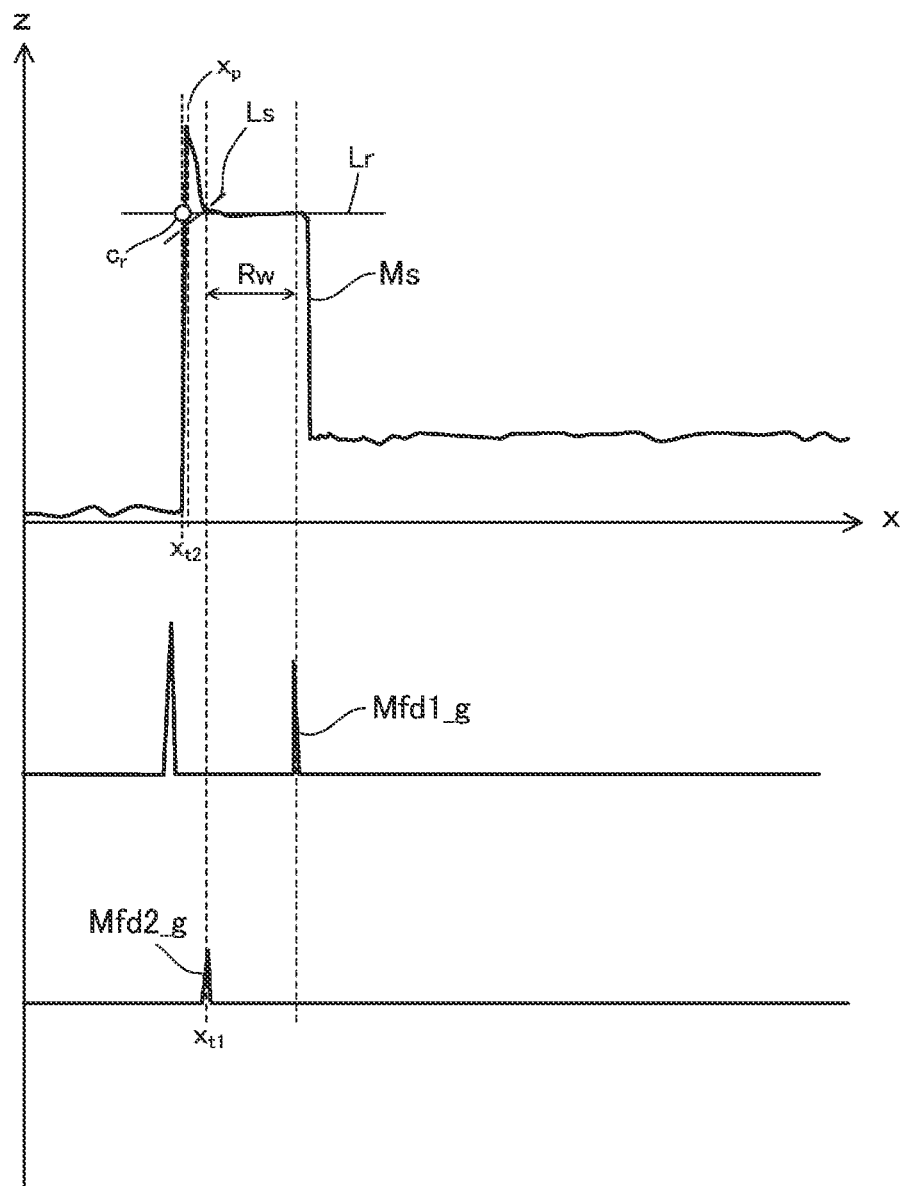
FIG. 14 is a diagram for explaining the process of extracting burr end points.

In the case in which the processing-target-portion-information generation unit 113 find only one burr end point, it determines, as illustrated in FIG. 14, a linear regression line Lr passing through the burr end point $x_{t1}$, using the point group data Ms within the range Rw from the burr end points $x_{t1}$ in the direction away from the maximum point $x_p$. Then, in the case in which the burr end point $x_{t1}$ is on the positive side of the maximum point $x_p$, viewed from the maximum point $x_p$ as a reference as illustrated in FIG. 14, the processing-target-portion-information generation unit 113 sets the intersection point $x_{t2}$ between the linear regression line Lr and the point group data Ms within a range on the negative side of the burr end point $x_{t1}$ as the other burr end point. In the case in which the found burr end point is on the negative side of the maximum point $x_p$, the processing-target-portion-information generation unit 113 sets the intersection point between the linear regression line Lr and the point group data Ms within a range on the positive side of the burr end point as the other burr end point.

Figure 15:
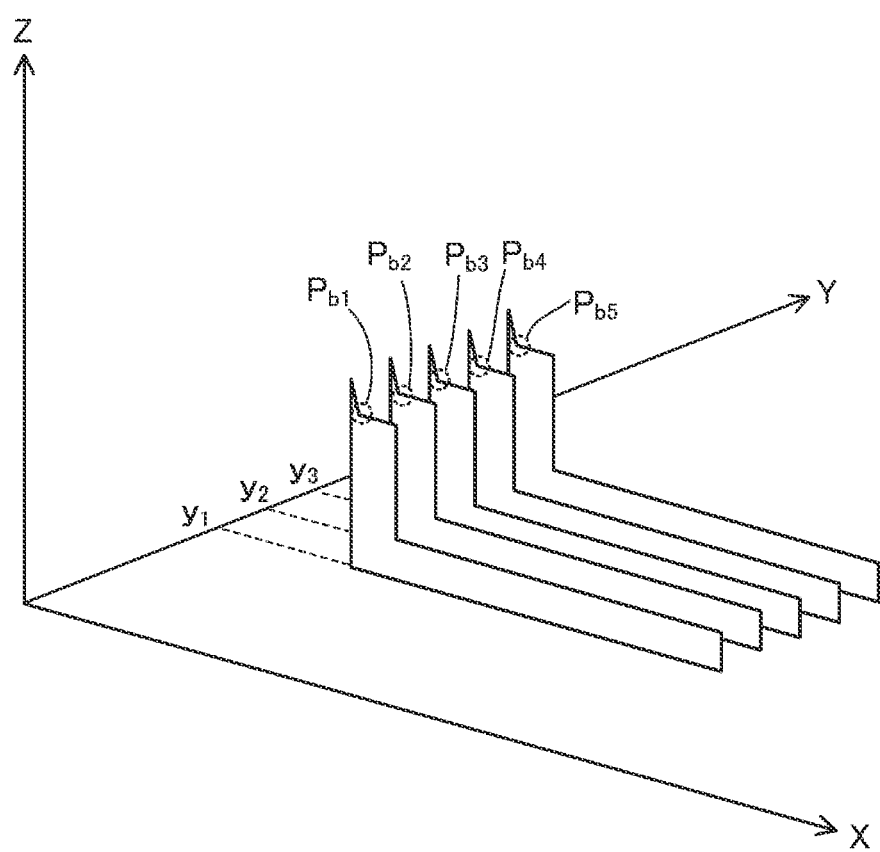
FIG. 15 is a diagram for explaining processing target points set for each distance measurement point.

In the next step S36, the processing-target-portion-information generation unit 113 sets a deburring processing point based on the extracted burr end points. Specifically, the processing-target-portion-information generation unit 113 sets, from the two extracted burr end points, the one having a larger z value as a processing target point. In this way, the processing-target-portion-information generation unit 113, as illustrated in FIG. 15, sets processing target points $P_{b1}$, $P_{b2}$, $P_{b3}$, and so on based on the measurement values by the laser sensor 30 at each detailed-position measurement point on the workpiece 20, and calculates the coordinate values in the robot coordinate system X, Y, Z of the processing target points $P_{b1}$, $P_{b2}$, $P_{b3}$, and so on.

Figure 16:
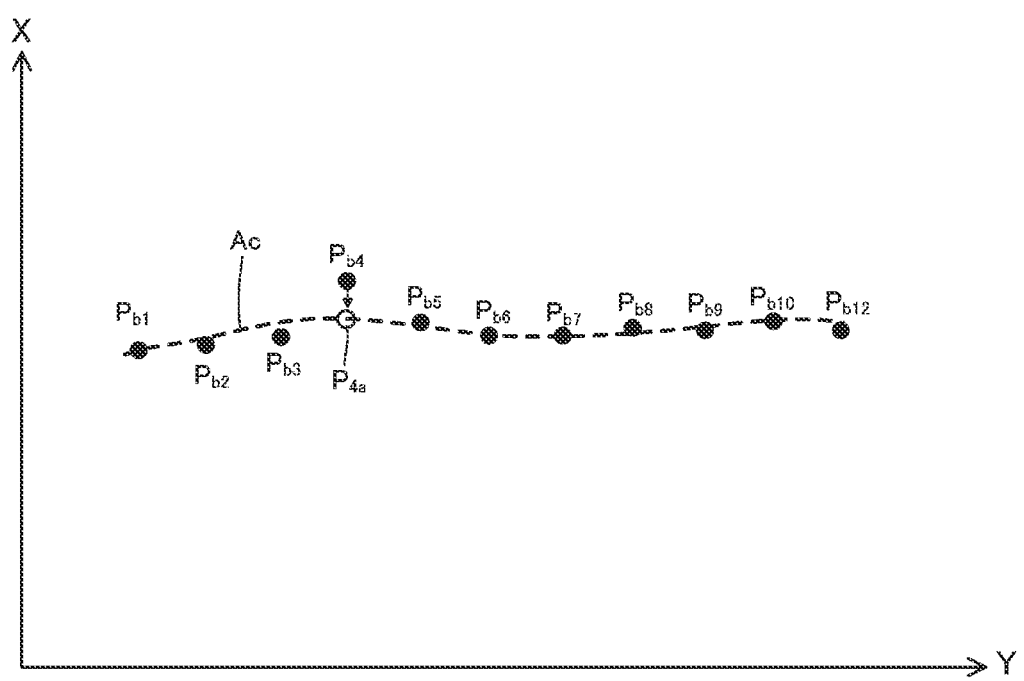
FIG. 16 is a diagram for explaining the process of generating the processing-target-portion information from the processing target points.

Then, the processing-target-portion-information generation unit 113, as illustrated in FIG. 16, determines a polynomial approximation curve Ac of the plurality of adjacent points from the coordinate values in the robot coordinate system X, Y of the plurality of processing target points $P_{b1}$, $P_{b2}$, $P_{b3}$, and so on. The processing-point-information generation unit 115 replaces the processing target point $P_{b4}$ which is a specified distance or more away from the polynomial approximation curve Ac with the point $P_{b4a}$ positioned on the polynomial approximation curve Ac in the X direction. The processing-target-portion-information generation unit 113 generates the processing-target-portion information 124 including data on the plurality of processing target points $P_{b1}$, $P_{b2}$, $P_{b3}$, and so on set as described above and stores it in the memory 120.

5. Other Embodiments

The embodiment described above includes the processing-target-portion-information generation unit 113, and the processing-target-portion-information generation unit 113 measures the workpiece 20 with the laser sensor 30 and generates the processing-target-portion information 124. As another embodiment, the processing-target-portion information 124 may be generated by estimating burr occurrence portions on the workpiece 20 from the CAD data of the workpiece 20. Alternatively, the operator may check burr occurrence portions on the workpiece 20 and create the processing-target-portion information 124.

Although in the above embodiment, the deburring processing is performed with the cutter blade 10 as a cutting tool, other types of cutting tools, such as end mills, may be used.

Although the above embodiment describes the processing apparatus 1 that performs deburring processing with a profiling process as specified processing in the present invention, the present invention is applicable to other types of processing. For example, in the case of performing chamfering with a profiling process, in the case of performing processing, such as drilling of designated positions, or in the case of performing processing using processing tools other than cutting tools, such as ones for laser processing, electrical discharge processing, plasma processing, and the like, the present invention can be applied by preparing processing-target-portion information indicating the processing target portion of the workpiece.

In the case of performing chamfering, as indicated with the line segment Ls in FIG. 14, a chamfer position may be determined according to the edge of the workpiece 20 in measuring the shape of the workpiece 20. Deburring, chamfering, drilling, and the like are secondary processing which is performed on workpieces already subjected to some processing, and the processes by the processing apparatus of the present invention is applicable to various types of secondary processing.

Although the embodiment described above uses the laser sensor 30 as a shape measurement unit of the present invention, the set position of the workpiece and the shape of the workpiece may be recognized by using other shape measurement units, such as cameras.

In the above embodiment, the processing-target-portion-information generation unit 113, as described above with reference to FIGS. 11 to 16, generates the processing-target-portion information 124 by setting the processing target points with performing processes on the point group data of the measurement values of the height of the workpiece 20 at each detailed-position measurement point calculated from the measurement values by the laser sensor 30, such as smoothing by a moving average method, calculating the first-order derivative values, and calculating the second-order derivative values, but the processing-target-portion information 124 may be generated using other techniques.

In addition to the processes in the above embodiment, the orientation of the cutter blade 10 (cutting tool) may be controlled as illustrated in FIG. 17. FIG. 17 illustrates a state in which the workpiece 20 is tilted by an angle θ relative to a specified reference surface H (for example, the horizontal plane in the state in which the workpiece 20 is set in the workpiece receiving unit 51). As indicated with K1, in the case of performing deburring processing in a state in which the workpiece 20 is tilted, by moving the TCP (tool center point) of the cutter blade 10 to a processing point Pt on the workpiece 20 with the orientation of the cutter blade 10 adapted to the reference surface H, the contact between the profiling portion 10B of the cutter blade 10 and a profiled surface portion 20B of the workpiece 20 is insufficient. Thus, it causes a problem in that the profiling processing does not provide sufficient effects.

To address this, when the processing-target-portion-information generation unit 113 measures the positions of the burrs of the workpiece 20 as described above, it may measure the tilt angle θ of the profiled surface portion 20B and may perform control to tilt the orientation of the cutter blade 10 according to the tilt angle θ of the profiled surface portion 20B, as indicated with K2. The workpiece-processing control unit 116 moves the TCP of the cutter blade 10 to the processing point Pt on the workpiece 20 while controlling the cutter blade 10 such that its orientation is tilted by the angle θ and then performs deburring processing. This allows the profiling portion 10B of the cutter blade 10 and the profiled surface portion 20B of the workpiece 20 to come in contact with each other appropriately, providing advantageous effects of profiling processing.

Also, in the case of using an end mill as a cutting tool used for profiling processing, the similar effects can be obtained by controlling the orientation of the end mill according to the tilt of the workpiece 20 in the same way. FIG. 18 illustrates an example in which an end mill 11 having profiling portions 11B and 11C with a right angle in between is used as a processing tool, and in which burrs 22 of the workpiece 20 are removed by profiling processing.

As indicated with K3 in FIG. 18, in the case in which the workpiece 20 is tilted by an angle θ relative to a reference surface H, and the TCP of the end mill 11, a cutting edge portion, is moved to the processing point Pt on the workpiece 20 with the orientation of the end mill 11 adapted to the case of the workpiece 20 being not tilted, and in which deburring processing is performed in this state, the contact between the profiling portions 11B and 11C of the end mill 11 and profiled surface portions 20B and 20C of the workpiece 20 is insufficient. Thus, it causes a problem in that the profiling processing does not provide sufficient effects.

To address this, as indicated with K4 in FIG. 18, it is effective to control the orientation of the end mill 11 such that it is tilted and adapted to the tilt angle θ of the profiled surface portion 20B, and to perform control to move the TCP of the end mill 11 to the processing point Pt on the workpiece 20. This allows the profiling portions 11B and 11C of the end mill 11 and the profiled surface portions 20B and 20C of the workpiece 20 to come in contact with one another appropriately, providing advantageous effects of profiling processing.

FIG. 19 illustrates an example in which an end mill 12 having a parallel profiling portion 12B is used as a processing tool, and in which burrs 22 of the workpiece 20 are removed by profiling processing. As indicated with K5 in FIG. 19, in the case in which the workpiece 20 is tilted by an angle θ relative to a reference surface H, and the TCP of the end mill 12 is moved to the processing point Pt on the workpiece 20 with the orientation of the end mill 12 adapted to the case of the workpiece 20 being not tilted, and in which deburring processing is performed in this state, the contact between the profiling portions 12B of the end mill 12 and the profiled surface portions 20B of the workpiece 20 is insufficient. Thus, it causes a problem in that the profiling processing does not provide sufficient effects.

To address this, as indicated with K6 in FIG. 19, it is effective to control the orientation of the end mill 12 such that it is tilted and adapted to the tilt angle θ of the profiled surface portion 20B, and to perform control to move the TCP of the end mill 12 to the processing point Pt on the workpiece 20. This allows the profiling portion 12B of the end mill 12 and the profiled surface portion 20B of the workpiece 20 to come in contact with each other appropriately, providing advantageous effects of profiling processing.

Figure 20:
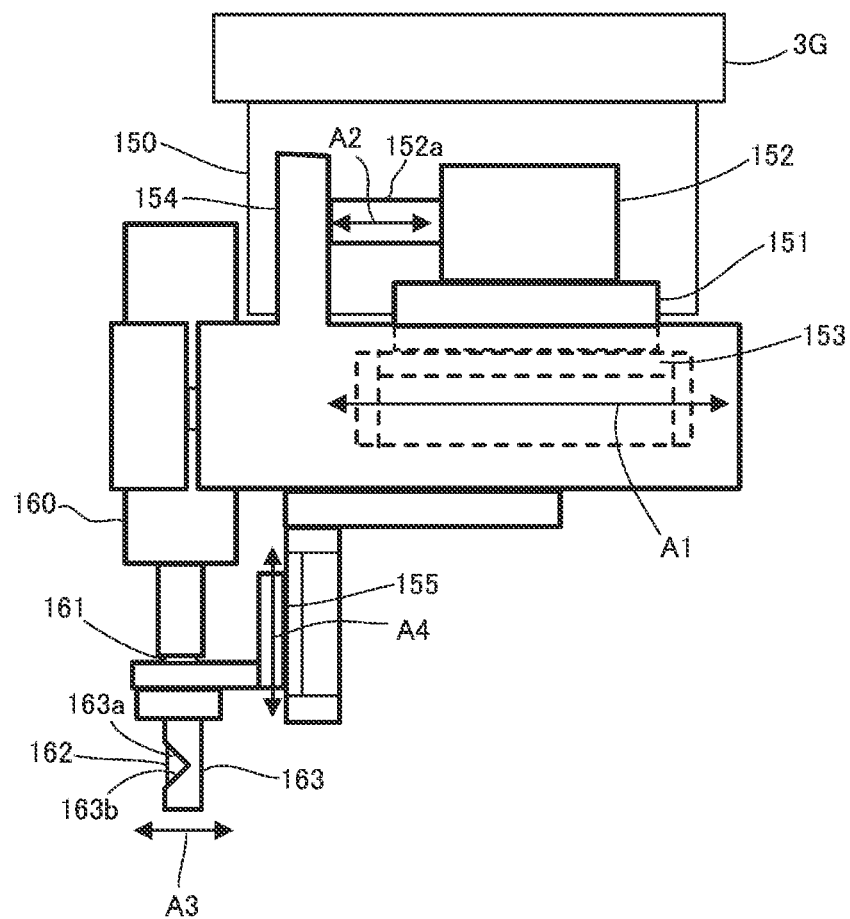
FIG. 20 is a diagram for explaining a configuration in which an end mill is attached to an arm distal-end portion of an articulated robot via a floating mechanism.

Here, FIG. 20 illustrates a configuration example in which an end mill 162 (which corresponds to a cutting tool) is attached via the floating mechanism to a base portion 150 fixed to the arm distal-end portion 3G of the articulated robot 3. A plate 151 is attached to the base portion 150, and a sliding unit 154 is attached to the plate 151 via a sliding mechanism 153. The sliding unit 154 can be moved in the A1 direction (horizontal direction) relative to the plate 151 by the sliding mechanism 153. A motor 160 is attached to the sliding unit 154, and the end mill 162 (which corresponds to a cutting tool) is attached to a chuck 161 on the output shaft of the motor 160. The end mill 162 is rotatably disposed in a substantially cylindrical sleeve 163, and two cut portions 163a and 163b that serve as profiling portions used for profiling processing are provided to the outer periphery of the sleeve 163.

An air cylinder 152 is attached to the plate 151, and a rod 152a of the air cylinder 152 is connected to the sliding unit 154. The position of the end mill 162 in the A3 direction can be moved by the air pressure from the air cylinder 152 to the sliding unit 154 caused by expansion and contraction of the rod 152*a* in the A2 direction. With this configuration, the sliding unit 154 serves as a floating mechanism configured to be floated relative to the workpiece 20. This floating mechanism makes it possible to press the end mill 162 toward the workpiece 20 appropriately in the A3 direction. The pressing force to the end mill 162 can be adjusted by adjusting the air pressure of the air cylinder 152. In addition, the sliding unit 154 is provided with a sliding mechanism 155 for adjusting the position of the end mill 162 in the A4 direction (up-down direction).

Figure 5:
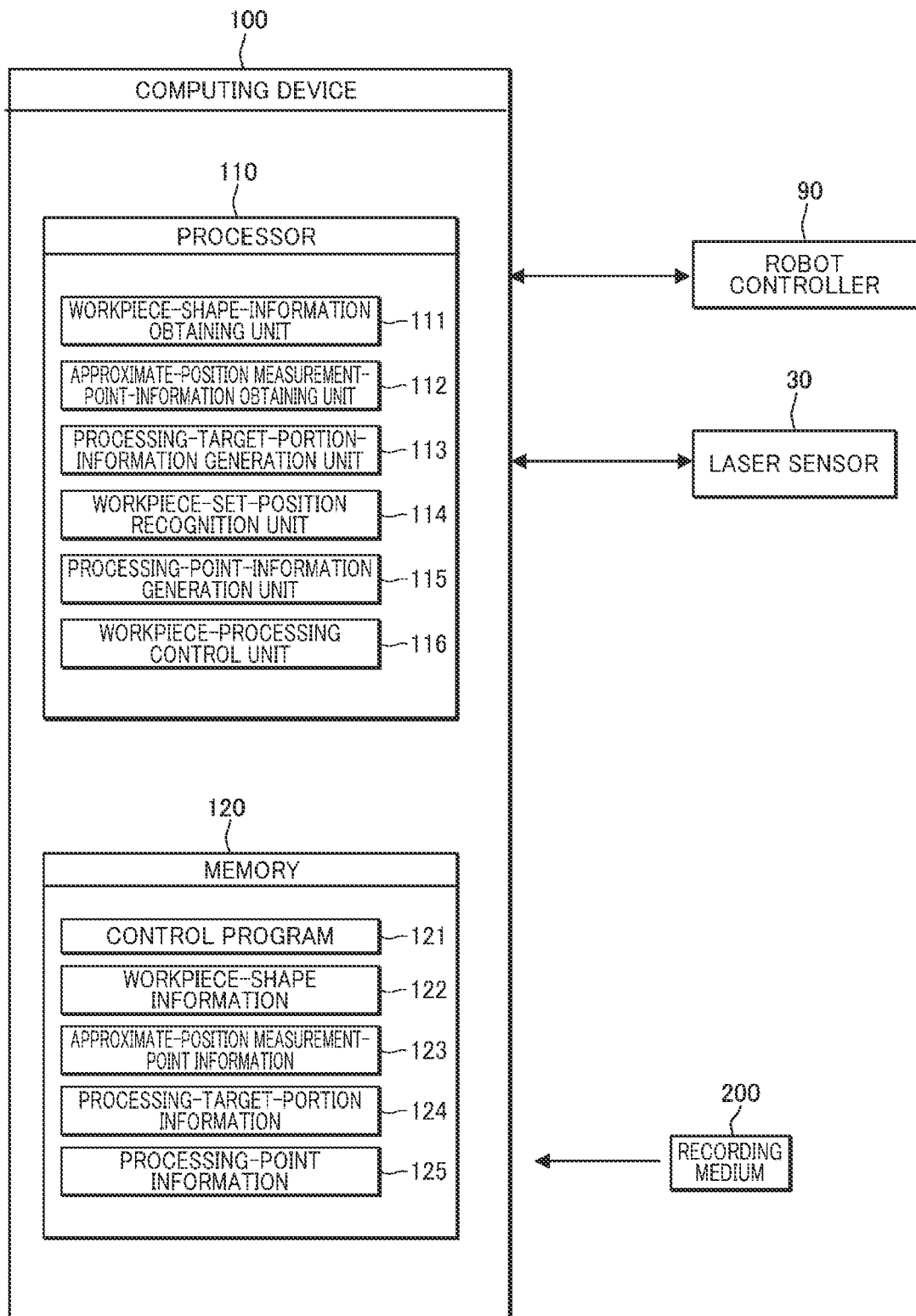
FIG. 5 is a configuration diagram of a computing device.

Note that FIG. 5 is a schematic diagram that illustrates the configuration of the control system of the processing apparatus 1 which is partitioned according to main processes in order to make it easy to understand the invention of the present application, but the configuration of the control system of the processing apparatus 1 may be partitioned differently. In addition, the processes of the constituents of the computing device 100 may be executed by one hardware unit or may be executed by a plurality of hardware units. The processes performed by the constituents illustrated in FIGS. 6 and 9 may be executed by one program or may be executed by a plurality of programs.

6. Configuration Supported by Above Embodiments

The above embodiments are specific examples of the following configurations.

(First clause) A processing apparatus including: an articulated robot having an arm distal-end portion to which a processing tool and a shape measurement unit are attached; a workpiece-set-position recognition unit that moves the arm distal-end portion to a specified position measurement point to measure a shape of a workpiece in a workpiece set state in which the workpiece is positioned by a workpiece positioning unit, and thereby recognizes a set position of the workpiece; a processing-point-information generation unit that, based on the set position of the workpiece recognized by the workpiece-set-position recognition unit and processing-target-portion information indicating a position of a target portion of the workpiece for specified processing, generates processing-point information indicating a processing point which is a movement point of the arm distal-end portion to perform the specified processing on the workpiece using the processing tool in the workpiece set state; and a workpiece-processing control unit that moves the arm distal-end portion to the processing point based on the processing-point information to perform the specified processing on the workpiece using the processing tool.

In the processing apparatus of the first clause, the processing-point-information generation unit generates the processing-point information for performing the specified processing on the workpiece based on the set position of the workpiece and the processing-target-portion information. Thus, it is possible to eliminate the need for the work of teaching the articulated robot the positions of the processing target portions of the workpiece.

(Second clause) The processing apparatus according to the first clause, in which the specified processing is partial processing for processing a part of the workpiece, and the processing apparatus includes a processing-target-portion-information generation unit that measures the shape of the workpiece using the shape measurement unit to recognize a position of a portion to be processed of the workpiece and, based on the position of the portion to be processed, generates the processing-target-portion information.

With the processing apparatus of the second clause, it is possible to recognize the actual position of the portion to be processed of the workpiece by measuring the shape of the workpiece and generate the processing-target-portion information.

(Third clause) The processing apparatus according to the second clause, in which the shape measurement unit measures a distance between the shape measurement unit and a measurement target at a plurality of distance measurement points within a measurement area in a specified direction, and the processing-target-portion-information generation unit: calculates group data of length measurement values at a plurality of positions on the workpiece in the specified direction from distance measurement values at the plurality of distance measurement points, the distance measurement values being measured on the workpiece by the shape measurement unit; calculates a plurality of length measurement values on the workpiece in the specified direction within the measurement area; and recognizes the position of the portion to be processed of the workpiece based on change in the plurality of length measurement values.

With the processing apparatus of the third clause, it is possible to identify the position of the portion to be processed from the change in the length measurement values of the workpiece and generate the processing-target-portion information.

(Fourth clause) The processing apparatus according to the third clause, in which the processing-point-information generation unit extracts an end point of the portion to be processed based on the change in the plurality of length measurement values to recognize the position of the portion to be processed of the workpiece.

With the processing apparatus of the fourth clause, in the case in which a portion to be removed has some width, it is possible to recognize the range of the portion to be processed by extracting an end point of the portion to be processed and generate the processing-target-portion information.

(Fifth clause) The processing apparatus according to the fourth clause, in which the processing-point-information generation unit extracts the end point of the portion to be processed by smoothing the plurality of length measurement values by a moving average method, determining a search range for the position of the portion to be processed based on first-order derivative values of the smoothed length measurement values, and searching the search range for a peak point of second-order derivative values of the length measurement values subjected to the smoothing.

With the processing apparatus of the fifth clause, it is possible to recognize an end point of the portion to be processed by performing smoothing using a moving average method to remove noises in the measurement values, and then calculating the first-order derivative values and the second-order derivative values of the length measurement values.

(Sixth clause) The processing apparatus according to any one of the first to fifth clauses, in which the workpiece is a resin molded member, the processing tool is a cutting tool having a cutting edge portion configured to be positioned at a root portion of a burr of the resin molded member and a profiling portion not having a cutting edge and configured to be positioned at a profiled surface portion of the resin molded member, and the cutting tool is attached to the arm distal-end portion via a pressing mechanism that presses the profiling portion against the profiled surface portion of the resin molded member at a specified pressure.

With the processing apparatus of the sixth clause, it is possible to eliminate the need for teaching the processing points when performing deburring processing on a resin molded member and also possible to accommodate the variations in the positions of the burrs formed, which can occur between different resin molded members, by the action of the profiling portion and perform deburring processing with high accuracy.

(Seventh clause) The processing apparatus according to the sixth clause, in which the processing-target-portion-information generation unit, when measuring the shape of the workpiece, recognizes a tilt of the profiled surface portion relative to a specified reference surface, and the processing apparatus includes a workpiece-processing control unit that controls, according to the tilt of the profiled surface portion, an orientation of the cutting tool at the time of performing deburring processing.

With the processing apparatus of the seventh clause, it is possible to perform deburring processing with the profiling portion of the cutting tool facing the profiled surface portion of the workpiece appropriately, by controlling the orientation of the cutting tool according to the tilt of the profiled surface portion of the workpiece.

REFERENCE SIGNS LIST

1 . . . processing apparatus, 3 . . . articulated robot, 3G . . . arm distal-end portion, 4 . . . sliding table, 5 . . . sliding unit, 10 . . . cutter blade, 10A . . . cutting edge portion, 10B . . . profiling portion, 20 . . . workpiece, 20B . . . profiled surface portion, 30 . . . laser sensor, 51$a$ . . . workpiece receiving unit, 90 . . . robot controller, 100 . . . computing device, 110 . . . processor, 111 . . . workpiece-shape-information obtaining unit, 112 . . . approximate-position measurement-point-information obtaining unit, 113 . . . processing-target-portion-information generation unit, 114 . . . workpiece-set-position recognition unit, 115 . . . processing-point-information generation unit, 116 . . . workpiece-processing control unit, 120 . . . memory, 121 . . . control program, 122 . . . workpiece-shape information, 123 . . . approximate-position measurement-point information, 124 . . . processing-target-portion information, 125 . . . processing-point information.

The invention claimed is:

1. A processing apparatus comprising:
an articulated robot having an arm distal-end portion to which a processing tool and a shape measurement unit that is a sensor are attached,
a workpiece receiving unit which includes a guide and on which a workpiece is placed with movement of the workpiece restricted by the guide, and
a processor, wherein the processor:
moves the arm distal-end portion to a specified position measurement point to measure a shape of the workpiece in a workpiece set state in which the workpiece is positioned by the workpiece receiving unit, and thereby recognizes a set position of the workpiece;
measures the shape of the workpiece using the shape measurement unit to recognize a position of a portion to be processed of the workpiece in partial processing for processing a part of the workpiece and, based on the position of the portion to be processed, generates processing-target-portion information indicating a position of a target portion of the workpiece for the partial processing;
based on the set position of the workpiece recognized and the processing-target-portion information generated, generates processing-point information indicating a processing point which is a movement point of the arm distal-end portion to perform the partial processing on the workpiece using the processing tool in the workpiece set state; and
moves the arm distal-end portion to the processing point based on the processing-point information to perform the specified processing on the workpiece using the processing tool,
the shape measurement unit measures a distance between the shape measurement unit and a measurement target at a plurality of distance measurement points within a measurement area in a specified direction,
the processor calculates group data of length measurement values at a plurality of positions on the workpiece in the specified direction from distance measurement values at the plurality of distance measurement points, the distance measurement values being measured on the workpiece by the shape measurement unit, calculates a plurality of length measurement values on the workpiece in the specified direction within the measurement area, and recognizes the position of the portion to be processed of the workpiece by extracting an end point of the portion to be processed by smoothing the plurality of length measurement values by a moving average method, determining a search range for the position of the portion to be processed based on first-order derivative values of the smoothed length measurement values, and searching the search range for a peak point of second-order derivative values of the length measurement values subjected to the smoothing.

2. The processing apparatus according to claim 1, wherein the workpiece is a resin molded member,
the processing tool is a cutting tool having a cutting edge portion configured to be positioned at a root portion of a burr of the resin molded member and a profiling portion not having a cutting edge and configured to be positioned at a profiled surface portion of the resin molded member, and
the cutting tool is attached to the arm distal-end portion via a slide that is slidable in a predetermined direction and that presses the profiling portion against the profiled surface portion of the resin molded member at a specified pressure.

3. The processing apparatus according to claim 2, wherein the processor, when measuring the shape of the workpiece, recognizes a tilt of the profiled surface portion relative to a specified reference surface, and
controls, according to the tilt of the profiled surface portion, an orientation of the cutting tool at a time of performing deburring processing.

* * * * *